US012802626B2

(12) United States Patent
Cheong et al.

(10) Patent No.: US 12,802,626 B2
(45) Date of Patent: Nov. 17, 2026

(54) DISPLAY APPARATUS AND CONTROLLING METHOD THEREOF

(71) Applicant: Samsung Electronics Co., Ltd., Suwon-si (KR)

(72) Inventors: Seongkoo Cheong, Suwon-si (KR); Younghoon Cho, Suwon-si (KR); Yeongchan Bae, Suwon-si (KR); Gaewon Seo, Suwon-si (KR); Jaehong Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 19/244,475

(22) Filed: Jun. 20, 2025

(65) Prior Publication Data

US 2025/0316221 A1 Oct. 9, 2025

Related U.S. Application Data

(63) Continuation of application No. PCT/KR2025/002720, filed on Feb. 27, 2025.

(30) Foreign Application Priority Data

Apr. 3, 2024 (KR) ........................ 10-2024-0045214

(51) Int. Cl.
*G09G 3/32* (2016.01)

(52) U.S. Cl.
CPC ........ *G09G 3/32* (2013.01); *G09G 2340/0435* (2013.01); *G09G 2340/16* (2013.01); *G09G 2360/145* (2013.01)

(58) Field of Classification Search
CPC ........................................................ G09G 3/32
See application file for complete search history.

(56) References Cited

U.S. PATENT DOCUMENTS 10,878,739 B2 12/2020 Yi et al.
11,310,436 B2 4/2022 Hochman et al.
(Continued)

FOREIGN PATENT DOCUMENTS

EP 4270371 A2 11/2023
JP 2011-257552 12/2011
(Continued)

OTHER PUBLICATIONS

International Search Report and Written Opinion dated Jun. 10, 2025 issued in PCT Application No. PCT/KR2025/002720.

*Primary Examiner* — William Boddie
*Assistant Examiner* — Andrew B Schnirel
(74) *Attorney, Agent, or Firm* — STAAS & HALSEY LLP

(57) ABSTRACT

A display apparatus is disclosed. One or more processors are configured to, by executing the one or more instructions, identify shutter speed information and shutter angle information corresponding to an photographing apparatus, identify multiplication information of a frame based on the identified shutter speed information and the identified shutter angle information, identify a driving signal of a plurality of frames displayed in each of frame sections based on multiplication information of the frame, compensate for an application time and amplitude of voltage corresponding to a driving signal of the last frame based on each of the frame sections being longer than time that the plurality of frames is displayed, and control the display to provide the last frame based on the compensated driving signal.

20 Claims, 13 Drawing Sheets

(56) References Cited

U.S. PATENT DOCUMENTS

| | | | | |
|---|---|---|---|---|
| 11,328,655 | B2 | 5/2022 | Sugiyama et al. | |
| 11,722,777 | B2 | 8/2023 | Deighton | |
| 11,881,151 | B2 | 1/2024 | Thielemans et al. | |
| 12,284,450 | B2 | 4/2025 | Park et al. | |
| 2017/0054938 | A1* | 2/2017 | Xu | G06T 5/70 |
| 2022/0060612 | A1* | 2/2022 | Hochman | H04N 23/617 |
| 2022/0103738 | A1* | 3/2022 | Deighton | H04N 23/74 |
| 2022/0166916 | A1* | 5/2022 | Park | H04N 23/745 |
| 2023/0328389 | A1 | 10/2023 | Deighton | |
| 2023/0364465 | A1 | 11/2023 | Kim et al. | |
| 2024/0040265 | A1 | 2/2024 | Park et al. | |

FOREIGN PATENT DOCUMENTS

| | | |
|---|---|---|
| KR | 10-2013-0132062 | 12/2013 |
| KR | 10-2020-0003534 | 1/2020 |
| KR | 10-2022-0075020 | 6/2022 |
| KR | 10-2022-0142180 | 10/2022 |
| KR | 10-2523167 B1 | 4/2023 |
| KR | 10-2023-0058431 | 5/2023 |
| KR | 10-2023-0157814 | 11/2023 |
| WO | WO 2018/164105 A1 | 9/2018 |

* cited by examiner

FIG. 12

LED FRAME RATE

ADVANCED SYNC ☑

DISPLAY/INPUT MULTPLICATION VALUE 1230 1220 1210 1240

| INPUT Hz | 23.976 | |
|---|---|---|
| SHUTTER ANGLE | SHUTTER SPEED(Hz) | MULTPLICATION VALUE |
| 360 | 23.976 | 16.000 |
| 288 | 29.970 | 16.250 |
| 270 | 31.968 | 16.000 |
| 225 | 38.362 | 16.000 |
| 180 | 47.952 | 16.000 |
| 172.8 | 49.950 | 16.667 |
| 144 | 59.940 | 15.000 |
| 135 | 63.936 | 16.000 |
| 120 | 71.928 | 15.000 |
| 105 | 82.203 | 13.714 |
| 90 | 95.904 | 16.000 |
| 72 | 119.880 | 15.000 |
| 45 | 191.808 | 16.000 |
| 22.5 | 383.616 | 16.000 |

DISPLAY APPARATUS AND CONTROLLING METHOD THEREOF

CROSS-REFERENCE TO RELATED APPLICATION(S)

This application is a continuation application, claiming priority under § 365(c), of an International application No. PCT/KR2025/002720, filed on Feb. 27, 2025,which is based on and claims the benefit of a Korean patent application number 10-2024-0045214, filed on Apr. 3, 2024, in the Korean Intellectual Property Office, the disclosure of which is incorporated by reference herein in its entirety.

BACKGROUND

1. Field

The disclosure relates to a display apparatus and a controlling method thereof, and more particularly to a display apparatus that includes a large format display and a controlling method thereof.

2. Description of Related Art

Recently, photographing technology that photographs by displaying a background and a surrounding environment of a specific space through a large format display is being developed with respect to photographing movies and advertisements.

Conventionally, the photographing technology involved a method in which a green screen or a chroma key was installed and after photographing the same, a re-editing of graphic work was carried out and photographed, but recently, a method in which a large format display is installed at a rear direction or in the surrounding of a performer being photographed, and photographing by displaying a virtual background and a surrounding environment is being employed more frequently.

SUMMARY

According to one or more embodiments of the disclosure, a display apparatus includes a display, a memory that stores one or more instructions, and one or more processors.

According to one or more embodiments, the one or more processors may be configured to, by executing the one or more instructions, identify shutter speed information and shutter angle information corresponding to a photographing apparatus, identify multiplication information of a frame based on the identified shutter speed information and the identified shutter angle information, identify driving signals for repeatedly outputting, in sections of the frame, a same frame as an original frame of the frame based on the identified multiplication information, compensate an application time and amplitude of a voltage of a driving signal of the identified driving signals for outputting a last same frame of the frame, based on a time for displaying the sections being longer than a time for displaying the original frame and each same frame, and control the display to provide the last same frame based on the driving signal having the compensated application time and the compensated amplitude of the voltage.

According to one or more embodiments, the driving signals may be pulse width modulation (PWM) signals.

According to one or more embodiments, the one or more processors may be configured to, by executing the one or more instructions, identify an overplus-time based on a difference in the time for displaying the sections and the time for displaying the original frame and each same frame, compensate for the application time of the voltage of the PWM signal that is the driving signal for outputting the last same frame based on the identified overplus-time, and compensate for the amplitude of the voltage of the PWM signal that is the driving signal for outputting the last same frame based on an amplitude of a voltage of PWM signals that are driving signals for outputting remaining same frames of the same frame repeatedly output.

According to one or more embodiments, the one or more processors may be configured to, by executing the one or more instructions, increase the application time of the voltage of the PWM signal that is the driving signal for the last same frame by a time equal to the overplus-time, and increase the amplitude of the voltage of the PWM signal that is the driving signal for outputting the last same frame to correspond to an amplitude of a voltage of the PWM signals that are driving signals for outputting the remaining same frames.

According to one or more embodiments, the display apparatus may further include a memory storing multiplication information according to a plurality of shutter angle information corresponding respectively to a plurality of shutter speed information, and the one or more processors may be configured to, by executing the one or more instructions, provide, through the display, a user interface (UI) including multiplication information according to the plurality of shutter angle information corresponding respectively to the plurality of shutter speed information stored in the memory.

According to one or more embodiments, the one or more processors may be configured to, by executing the one or more instructions, identify, based on one from among the multiplication information included in the UI provided through the display being selected according to a user input, multiplication information of the frame based on the selected multiplication information.

According to one or more embodiments, the one or more processors may be configured to, by executing the one or more instructions, identify a time that each same frame is to be displayed based on the identified shutter speed information and the identified shutter angle information, and identify multiplication information of the frame based on the time that each same frame is to be displayed.

According to one or more embodiments, the multiplication information may be information indicating a number of times that the same frame is to be displayed in each of the sections.

According to one or more embodiments, the display may be a light emitting diode (LED) display including a plurality of LED pixels, and the one or more processors may be configured to, by executing the one or more instructions, synchronize photographing of the photographing apparatus and driving of the LED display by performing multiplication of a driving frequency of the LED display to correspond to the same frames displayed in each of the sections based on multiplication information.

According to one or more embodiments, the one or more processors may be configured to, by executing the one or more instructions, display a background image in the display by performing multiplication of a frame corresponding to the background image, and the photographing apparatus may be configured to obtain an image which photographed the background image displayed in the display and a user positioned at a front direction of the background image.

According to one or more embodiments, a controlling method of a display apparatus includes identifying shutter speed information and shutter angle information corresponding to a photographing apparatus, identifying multiplication information of a frame based on the identified shutter speed information and the identified shutter angle information, identifying driving signals for repeatedly outputting, in sections of the frame, a same frame as an original frame of the frame based on the identified multiplication information, compensating an application time and amplitude of a voltage of a driving signal of the identified driving signals for outputting a last same frame, based on a time for displaying the sections being longer than a time for displaying the original frame and each same frame, and controlling the display to provide the last same frame based on the driving signal having the compensated application time and the compensated amplitude of the voltage.

According to one or more embodiments, a non-transitory computer-readable storage medium may store computer instructions for a display apparatus to perform operations when executed by a processor of the display apparatus, the operations including identifying shutter speed information and shutter angle information corresponding to a photographing apparatus, identifying multiplication information of a frame based on the identified shutter speed information and the identified shutter angle information, identifying driving signals for repeatedly outputting, in sections of the frame, a same frame as an original frame of the frame based on the identified multiplication information, compensating an application time and amplitude of a voltage of a driving signal of the identified driving signals for outputting a last same frame, based on a time for displaying the sections being longer than a time for displaying the original frame and each same frame, and controlling the display to provide the last same frame based on the driving signal having the compensated application time and the compensated amplitude of the voltage.

BRIEF DESCRIPTION OF THE DRAWINGS

FIG. 12 is a diagram illustrating a UI including multiplication information according to one or more embodiments.

DETAILED DESCRIPTION

Terms used in describing various embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have", "may have", "include", and "may include" are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B".

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element).

A singular expression includes a plural expression, unless otherwise specified. It is to be understood that the terms such as "configured" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used herein perform at least one function or operation, and may be implemented with a hardware or software, or implemented with a combination of hardware and software. In addition, a plurality of "modules" or a plurality of "parts", except for a "module" or a "part" which needs to be implemented with a specific hardware, may be integrated in at least one module and implemented as at least one processor (not shown).

In the disclosure, the term "user" may refer to a person using an electronic apparatus or a device using the electronic apparatus.

Embodiments of the disclosure will be described in greater detail below with reference to the accompanied drawings.

Figure 1:
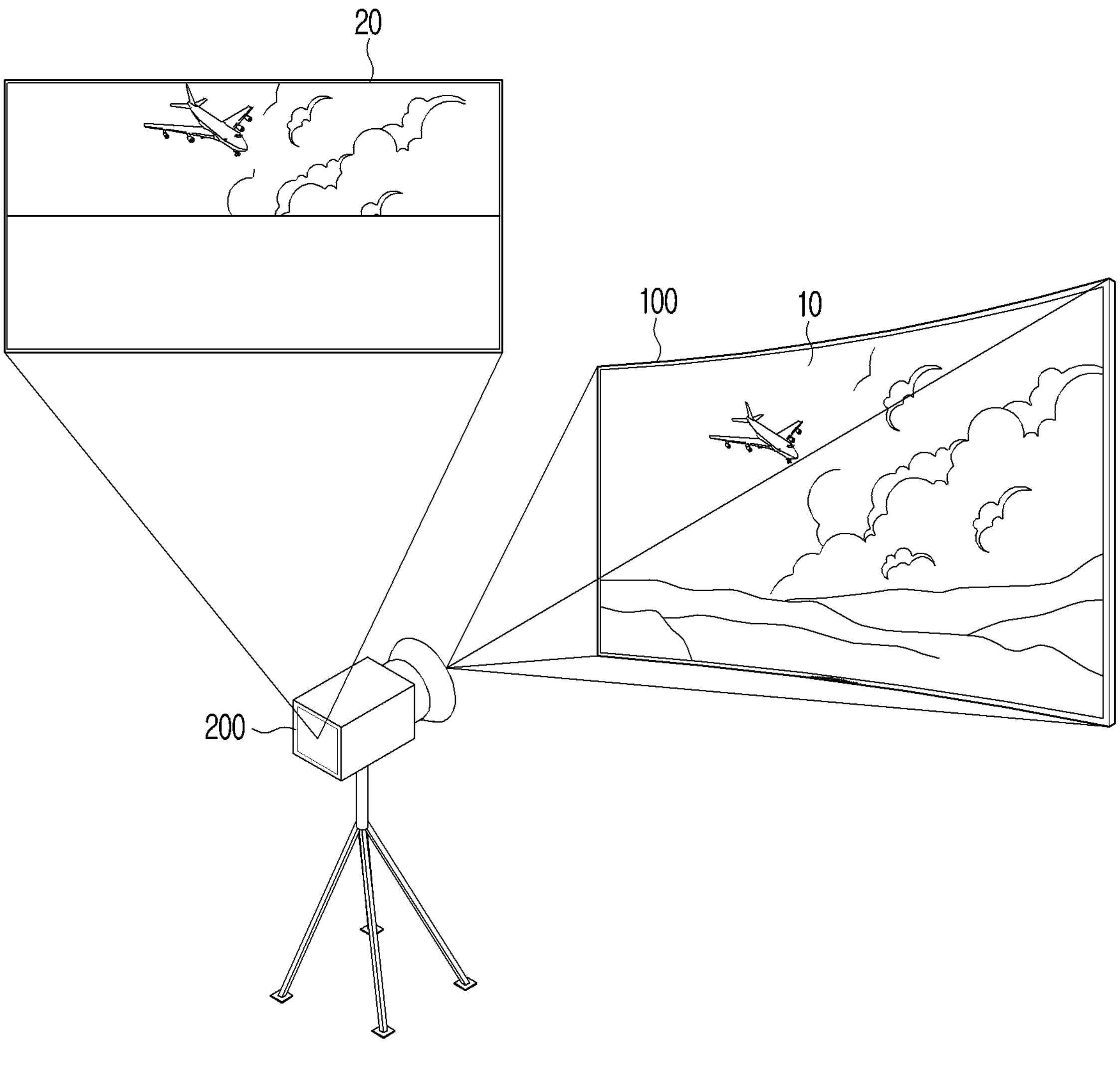
FIG. 1 is a diagram illustrating an operation of a display apparatus according to one or more embodiments.

FIG. 1 is a diagram illustrating an operation of a display apparatus according to one or more embodiments.

A display apparatus 100 may be an apparatus for displaying a background and/or a surrounding environment for a specific space to photograph movies and/or advertisements. The display apparatus 100 may output an input image for a background and a surrounding environment through a large-scale display screen. The display apparatus 100 may display a background for a specific space by being positioned at a rear direction of a performer being photographed that is photographing movies and advertisements. The display apparatus 100 may be positioned not only at the rear direction of the performer being photographed, but also at an upper end, a lower end, both sides, or in a form surrounding the whole. The display apparatus 100 may be implemented into various forms such as, for example, and without limitation, a large-scale display, a modular display, a curved display, a flexible display, and the like.

While the display apparatus 100 is displaying the background and/or the surrounding environment for the specific space, a photographing apparatus 200 may photograph a screen displayed in the display apparatus 100. Here, the photographing apparatus 200 may be an apparatus for photographing the performer being photographed with respect to photographing movies and advertisements, the background, or the surrounding environment. The photographing apparatus 200 may be implemented into various forms, such as, for example, and without limitation, a digital camera, a digital cinema camera, a video camera, a film camera, a digital single-lens reflex (DSLR) camera, an action camera, a handycam, and the like.

Referring to FIG. 1, the display apparatus 100 may output a background image 10 for photographing cinemas and advertisements. The display apparatus 100 may output the background image 10 based on a specific driving frequency by controlling a driver integrated circuit (IC). For example, the display apparatus 100 may output the background image 10 according to a driving frequency of 24 Hz or 60 Hz.

If the photographing apparatus 200 photographs the background image 10 output from the display apparatus 100 according to a driving frequency, a screen tearing phenomenon may appear in the background image photographed from the photographing apparatus 200. Specifically, the screen tearing phenomenon may appear according to a driving frequency for an output image of the display apparatus 100 and a shutter speed and a shutter angle of the photographing apparatus 200.

The shutter speed of the photographing apparatus may refer to time taken for a shutter of the photographing apparatus to open and receive light to photograph one scene. More scenes may be photographed the faster the shutter speed is during a same time. For example, if the shutter speed is 60 Hz, the photographing apparatus 200 may photograph 60 scenes during one second, that is, photograph and store one scene during 1/60 second. The shutter speed is not limited to the above, and may be variously designated as a frame speed, a photographing speed, and the like, but in the disclosure, the term will be collectively referred to as the shutter speed.

The shutter angle of the photographing apparatus may refer to an angle at which a rotating shutter of the photographing apparatus is opened and closed. The rotating shutter may capture individual frames as light is introduced once every time a disk with an angle-type hole that has a specific angle is revolved. At this time, the rotating shutter of the photographing apparatus may adjust an amount of light incident depending on a size of the shutter angle, and a range of a scene of a frame being photographed may vary. Meanwhile, the shutter angle is not limited thereto, and may be variously designated as an exposure angle, an aperture angle, and the like, but in the disclosure, the term will be collectively referred to as the shutter angle.

For example, if the driving frequency of the display apparatus 100 is 24 Hz, and the shutter speed of the photographing apparatus 200 is 24 Hz, an image for an output image photographed from the photographing apparatus 200 may be an image 20 with a portion of the screen cut as shown in FIG. 1 and not a whole frame image for the specific frame.

For example, if the driving frequency of the display apparatus 100 is 24 Hz, the shutter speed of the photographing apparatus 200 is 24 Hz, and the shutter angle is 180°, the image for the output image photographed from the photographing apparatus 200 may be the image 20 with 50% cut from among the whole frame for the specific frame as shown in FIG. 1.

For example, if the driving frequency of the display apparatus 100 is 24 Hz, the shutter speed of the photographing apparatus 200 is 24 Hz, and the shutter angle is 216°, the image for the output image photographed from the photographing apparatus 200 may be an image 20 with 40% cut from among the whole frame for the specific frame.

According to an example, if the driving frequency for the background image 10 of the display apparatus 100 and the shutter speed of the photographing apparatus 200 are different, the background image 10 that the display apparatus 100 outputs may show the screen tearing phenomenon in the image for the background image photographed from the photographing apparatus 200. According to an example, even if the driving frequency for the background image 10 of the display apparatus 100 and the shutter speed of the photographing apparatus 200 are the same, the screen tearing phenomenon 20 may appear according to the shutter angle of the photographing apparatus 200.

According to an embodiment, the display apparatus 100 may output by performing multiplication of a frame of an output image to prevent the screen tearing phenomenon. A frame multiplication may be a method of repeatedly outputting a frame several times. According to an example, the display apparatus 100 may perform multiplication of a driving frequency and output a same plurality of frames in each of frame sections.

For example, the display apparatus 100 may repeatedly output the same plurality of frames as with a relevant frame from each of the frame sections. The each of the frame sections may be a time section in which one frame is output according to a frame rate of the display apparatus 100. The frame rate may indicate a number of frames per unit time in an image. Generally, the frame rate is measured by number of frames per second, and the unit may be frames per second (FPS).

If a frame from each of the frame sections is performed multiplication and output, a flicker phenomenon may appear according to a driving time and an amplitude of the last frame from among a plurality of frames output from each of the frame sections. The flicker phenomenon is not limited thereto, and may be variously designated as a blinking phenomenon, a flash phenomenon. And the like, but in the disclosure, the term will be collectively referred to as the flicker phenomenon.

The flicker phenomenon may refer to a flickering phenomenon that appears as a display screen repeatedly turns-on and turns-off quickly at a specific frequency. For example, during one first frame section, if a driving time of the last frame from among the plurality of frames that performed multiplication with a same frame as frame 1 falls short of a driving time of the first frame section, the blinking phenomenon which appears by brightness of light due to there being no screen output from an off time of the last frame to a starting time-point of a second frame section.

A method of preventing the screen tearing phenomenon and the flicker phenomenon by controlling a driving frequency for an output image of the display apparatus 100 will be described in detail below.

Figure 2:
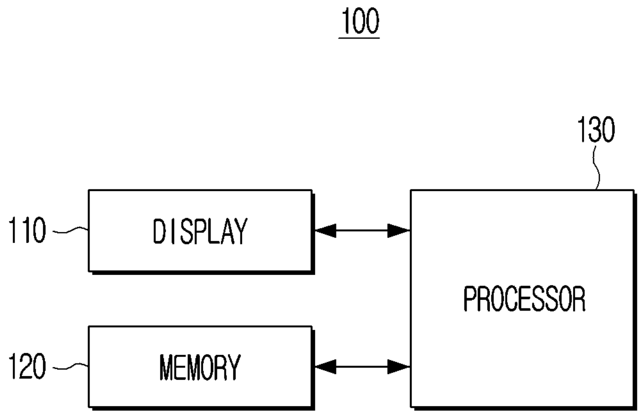
FIG. 2 is a block diagram illustrating a configuration of a display apparatus according to one or more embodiments.

FIG. 2 is a block diagram illustrating a configuration of a display apparatus according to one or more embodiments.

Referring to FIG. 2, the display apparatus 100 may include a display 110, a memory 120, and one or more processors 130. However, the above is not limited thereto, and the display apparatus 100 may be implemented in a form with a portion of the configurations excluded or implemented in a form with other configurations further included.

The display 110 may be a configuration for outputting an input image for a background and surrounding environment for a specific space and providing to a user. The display 110 may be implemented as a display including self-emissive devices or a display including non-emissive devices and a backlight. For example, the display 110 may be implemented as a display of various types such as, for example, and without limitation, a liquid crystal display (LCD), an organic light emitting diode (OLED) display, light emitting diodes (LEDs), a micro LED, a mini LED, a plasma display panel (PDP), a quantum dot (QD) display, quantum dot light emitting diodes (QLEDs), or the like. In the display 110, driving circuitry, which may be implemented in a form of an a-si TFT, a low temperature poly silicon (LTPS) TFT, an organic TFT (OTFT), or the like, a backlight unit, and the like may be included. According to an example, the display 110 may be implemented as a flat display, a curved display, a foldable and/or rollable flexible display, a touch display, or the like.

According to an example, the one or more processors 130 may provide a user interface (UI) including multiplication information according to a plurality of shutter angle information corresponding respectively to a plurality of shutter speed information through the display 110.

The memory 120 may store at least one instruction, data, program, and the like necessary in an operation of the display apparatus 100. In an example, the memory 120 may store multiplication information according to the plurality of shutter angle information corresponding respectively to the plurality of shutter speed information.

The memory 120 may be implemented in a form of a memory embedded in the display apparatus 100 according to a data storage use, or implemented in a form of a memory attachable to or detachable from the display apparatus 100. In an example, data for the driving of the display apparatus 100 may be stored in the memory embedded in the display apparatus 100, and data for an expansion function of the display apparatus 100 may be stored in the memory attachable to and detachable from the display apparatus 100.

The memory embedded in the display apparatus 100 may be implemented as at least one from among a volatile memory (e.g., a dynamic RAM (DRAM), a static RAM (SRAM), or a synchronous dynamic RAM (SDRAM)), or a non-volatile memory (e.g., a one-time programmable ROM (OTPROM), programmable ROM (PROM), an erasable and programmable ROM (EPROM), an electrically erasable and programmable ROM (EEPROM), a mask ROM, a flash ROM, a flash memory (e.g., NAND flash or NOR flash), a hard disk drive (HDD) or a solid state drive (SSD)).

The memory 120 may be implemented as a single memory that stores data generated from various operations according to the disclosure, but is not limited thereto, and the memory 120 may be implemented to include a plurality of memories that respectively store data of different types, or respectively store data generated at different steps.

The one or more processors 130 may control an overall operation of the display apparatus 100. Specifically, the one or more processors 130 may control the overall operation of the display apparatus 100 connected with each configuration of the display apparatus 100. For example, the one or more processors 130 may control the overall operation of the display apparatus 100 by being electrically connected with the display 110 and the memory 120. The one or more processors 130 may be configured into one or a plurality of processors.

The one or more processors 130 may perform, by executing one or more instructions stored in the memory 120, an operation of the display apparatus 100 according to the various embodiments.

The one or more processors 130 may include one or more from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors 130 may control one or a random combination from among other elements of an electronic device, and perform an operation associated with communication or data processing. The one or more processors 130 may execute one or more programs or instructions stored in the memory. For example, the one or more processors may perform, by executing the one or more instructions stored in the memory, a method according to one or more embodiments of the disclosure.

When a method according to one or more embodiments of the disclosure includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The one or more processors 130 may be implemented as a single core processor that includes one core, or implemented as one or more multicore processors that include a plurality of cores (e.g., a homogeneous multicore or a heterogeneous multicore). If the one or more processors 130 are implemented as multicore processors, each of the plurality of cores included in the multicore processors may include a memory inside the processor such as a cache memory and an on-chip memory, and a common cache shared by the plurality of cores may be included in the multicore processors. In addition, each of the plurality of cores (or a portion from among the plurality of cores) included in the multicore processors may independently read and perform a program command for implementing a method according to one or more embodiments of the disclosure, or read and perform a program command for implementing a method according to one or more embodiments of the disclosure due to a whole (or a portion) of the plurality of cores being interconnected.

When a method according to one or more embodiments of the disclosure includes a plurality of operations, the plurality of operations may be performed by one core from among the plurality of cores or performed by the plurality of cores included in the multicore processors. For example, when a first operation, a second operation, and a third operation are performed by a method according to one or more embodiments, the first operation, the second operation, and the third operation may all be performed by a first core included in the multicore processors, or the first operation and the second operation may be performed by the first core included in the multicore processors and the third operation may be performed by a second core included in the multicore processors.

In the embodiments of the disclosure, the processor may refer to a system on chip (SoC), a single core processor, or multicore processors in which the one or more processors and other electronic components are integrated or a core included in the single core processor or the multicore processors, and the core herein may be implemented as the CPU, the GPU, the APU, the MIC, the NPU, the hardware accelerator, the machine learning accelerator, or the like, but the embodiments of the disclosure are not limited to the above. For convenience of description, the one or more processors 130 will be designated as the processor 130 below.

According to an embodiment, the processor 130 may output an output image based on a specific driving frequency by controlling the driver IC. According to an example, the processor 130 may be implemented in a form including the driver IC for driving the display 110. For example, the processor 130 may be implemented as the DSP, and may be implemented with a digital driver IC and one chip. However, the driver IC may also be implemented with hardware separate from the processor 130. For example, if the pixels included in the display are implemented as an LED device, the driver IC may be implemented as at least one LED driver that controls current applied to the LED device.

According to an embodiment, the LED driver may receive voltage from a power supply disposed at a rear end of the power supply (e.g., switching mode power supply (SMPS)). However, according to another embodiment, voltage may be received from a separate power device.

According to an embodiment, the processor 130 may identify shutter speed information and shutter angle information corresponding to the photographing apparatus 200. In an example, the processor 130 may identify the shutter speed information and the shutter angle information from a user input. In an example, the processor 130 may receive the shutter speed information and the shutter angle information from the photographing apparatus 200. In an example, the processor 130 may receive speed information and shutter angle information corresponding to the photographing apparatus 200 from at least one from among a mobile device, a server, or an external apparatus.

According to an embodiment, the processor 130 may identify multiplication information of a frame based on the identified shutter speed information and the identified shutter angle information. The multiplication information may refer to information on a number of times a frame corresponding to each of the frame sections is repeated and displayed in each of the frame sections. Specifically, the above refers to information on an integer multiple that the display apparatus multiplies to an input frequency to output a higher frequency. For example, the display apparatus 100 may output, based on the driving frequency being 24 Hz, an image of 360 Hz by performing multiplication by 15 to an existing driving frequency to output the input image at a driving frequency of 360 Hz. The multiplication information is not limited thereto, and may be variously designated as magnification information, multiplication information, amplification information, and the like, but in the disclosure, the term will be collectively referred to as the multiplication information.

According to an embodiment, the processor 130 may identify time that each of the plurality of frames is displayed in each of the frame sections.

In an example, the processor 130 may identify multiplication information according to the multiplication information stored in the memory 120 based on the identified shutter speed information and shutter angle information.

In an example, the processor 130 may identify multiplication information by calculating a multiplication value based on a display time corresponding to each of the identified plurality of frames.

According to an embodiment, the processor 130 may identify a driving signal of the plurality of frames that is displayed in each of the frame sections based on the multiplication information. For example, the processor 130 may identify frequency information for the plurality of frames, and identify a pulse width modulation (PWM) signal based on the frequency information. The PWM signal may refer to a signal that is apparent by adjusting a pulse of a frequency signal according to a specific amplitude. Specifically, the above refers to a signal that indicates a driving signal corresponding to a specific amplitude and a specific pulse by adjusting an activation time of a driving signal driven in each of the frames.

According to an embodiment, the processor 130 may compensate for an application time and amplitude of voltage corresponding to a driving signal of the last frame based on each of the frame sections being longer than time that the plurality of frames is displayed. For example, the processor 130 may prevent the flicker phenomenon between each of the frames by increasing the driving time of the last frame when time that the last frame is displayed and time that a following frame section is started are not a match in the specific frame section.

Figure 3:
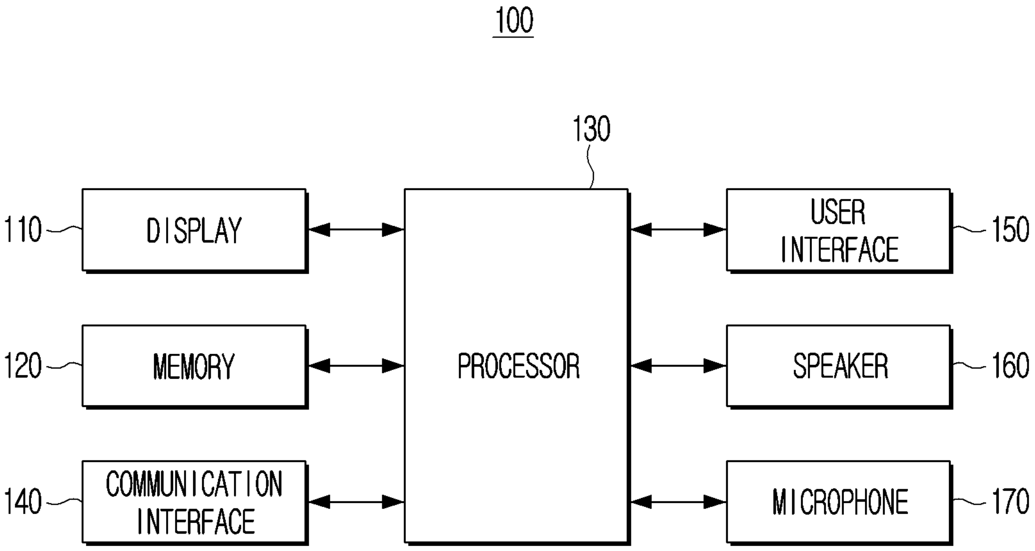
FIG. 3 is a block diagram illustrating a detailed configuration of a display apparatus according to one or more embodiments.

FIG. 3 is a block diagram illustrating a detailed configuration of a display apparatus according to one or more embodiments.

Referring to FIG. 3, the display apparatus 100 may include the display 110, the memory 120, the one or more processors 130, a communication interface 140, a user interface 150, a speaker 160, and a microphone 170. Detailed descriptions for configurations that overlap with the configurations shown in FIG. 2 from among the configurations shown in FIG. 3 will be omitted.

The communication interface 140 may include circuitry, and perform communication with an external apparatus (a photographing apparatus or a server). For example, the processor 130 may receive various data or information from the external apparatus connected through the communication interface 140, and transmit various data or information to the external apparatus.

The communication interface 140 may include at least one from among a Wi-Fi module, a Bluetooth module, a wireless communication module, a near field communication (NFC) module, and an ultra wide band (UWB) module. At this time, the wireless communication module may perform communication according to various communication standards such as, for example, and without limitation, IEEE, ZigBee, 3rd Generation (3G), 3rd Generation Partnership Project (3GPP), Long Term Evolution (LTE), 5th Generation (5G), and the like.

In an example, the processor 130 may receive the shutter speed information and the shutter angle information from the photographing apparatus 200 through the communication interface 140. In an example, the processor 130 may receive multiplication information of a frame from a server through the communication interface 140.

The user interface 150 may be implemented with a device such as a button, a touch pad, and the like on the display apparatus 100, or implemented as a touch screen capable of performing a display function and an operation input function together therewith.

In an example, the user interface 150 may receive a user input inputting the shutter speed information, the shutter angle information, and the multiplication information of the frame, a user input selecting the multiplication value of the frame, and the like.

The speaker 160 may output by converting and amplifying a digital sound signal processed in the processor 130 to an analog sound signal. For example, the speaker 160 may include at least one speaker unit, a D/A converter, an audio amplifier, and the like which can output at least one channel. For example, the speaker 160 may output a sound signal of an output image that is output from the display apparatus 100.

The microphone 170 may be a configuration for receiving a user voice or other sounds and converting to audio data.

In an example, the microphone 170 may receive the user voice and the like such as the shutter speed information, the shutter angle information, and the multiplication information of the frame, and the like. However, according to another example, the display apparatus 100 may receive a user voice input through the external apparatus through the communication interface 140.

Figure 4:
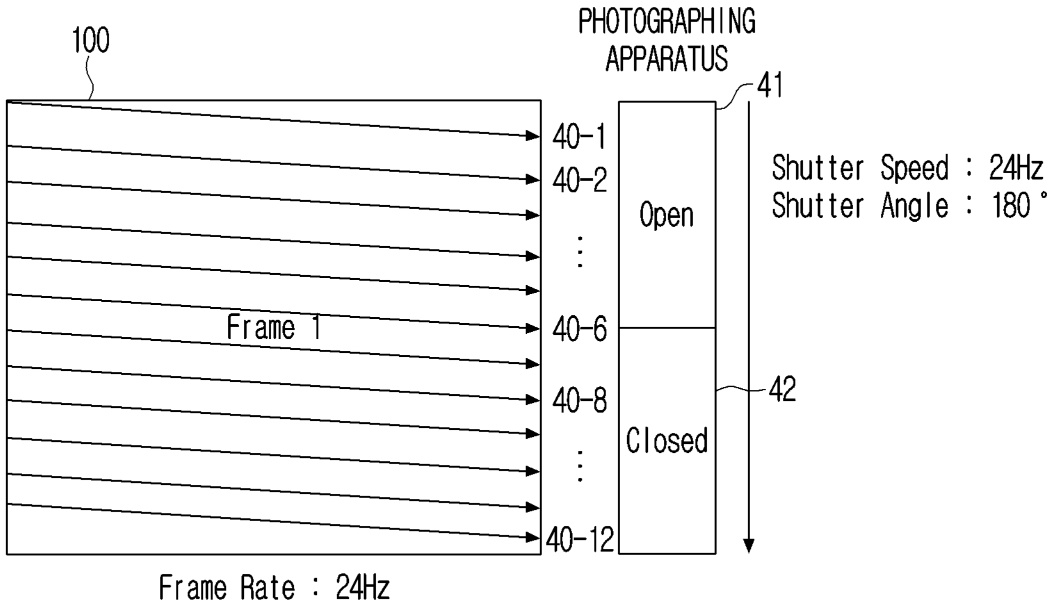
FIG. 4 and FIG. 5 are diagrams illustrating a frame output process of a display apparatus according to one or more embodiments of the disclosure.
Figure 5:
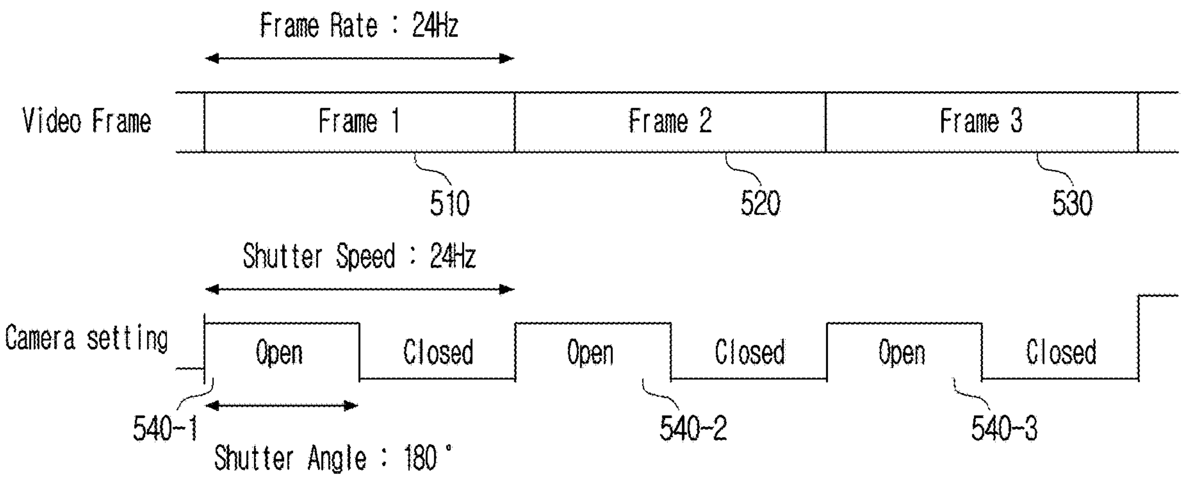

FIG. 4 and FIG. 5 are diagrams illustrating a frame output process of a display apparatus according to one or more embodiments of the disclosure.

According to an embodiment, the display apparatus 100 may sequentially scan an image signal corresponding to one frame along a specific direction and output a frame in a screen of the display 110.

Referring to FIG. 4, the display apparatus 100 may output one frame, for example, image signals 40-1 to 40-12 for frame 1 by sequentially scanning along a specific direction rather than outputting all at once. For example, if the driving frequency of the display apparatus 100 is 24 Hz, the display apparatus 100 may output an image by sequentially scanning the image signal corresponding to frame 1 from an upper side to a lower side of a display screen for 1/24 second. The display apparatus 100 may reduce power consumption by activating pixels of a specific area rather than activating all pixels disposed throughout the display simultaneously and improve the overall performance of the display apparatus 100. In FIG. 4, the display apparatus 100 has been shown as scanning the image signal from the upper side to the lower side direction, but is not limited thereto, and may scan the image signal to other directions.

For example, the display apparatus 100 may scan the image signal in an order of 40-1, 40-2, . . . , 40-6, . . . , 40-12 for frame 1, sequentially generate an image, and output a whole image.

For example, if the shutter speed of the photographing apparatus 200 is 24 Hz, and the shutter angle thereof is 180°, the time spent for the rotating shutter of the photographing apparatus 200 to rotate once may be 1/24 second, and an open state 41 and a closed state 42 may respectively be half during a whole rotation section. That is, the photographing apparatus 200 may operate the open state 41 and the closed state 42 for 1/48 second each during the 1/24 second, and photograph the output image of the display apparatus 100. At this time, if the photographing apparatus 200 photographs the output image of the display apparatus 100, the photographed image for the output image may be half of the image 40-1 to 40-6, rather than all the images of frame 1.

For example, if the shutter angle of the photographing apparatus 200 is increased from 180° to 200°, a ratio of the open state may be increased more than the closed state. Accordingly, in the image photographed from the photographing apparatus 200, a relatively wider range image may be included compared to when the shutter angle is 180°. For example, if the shutter angle is 200°, in the image photographed from the photographing apparatus 200, an image 40-1 to 40-8 of a further wider range than the image 40-1 to 40-6 included in the image photographed at 180° may be included.

Referring to FIG. 5, the display apparatus 100 may sequentially output a plurality of frames 510, 520, and 530 for a preset time (1/24 second) according to an output frequency of the display 110. In FIG. 5, a section for each of the frames 510, 520, and 530, and an open state section and a closed state section of the shutter may refer to time. If the display apparatus 100 is photographed from the photographing apparatus 200 while the display apparatus 100 is outputting the plurality of frames 510, 520, and 530, because the photographing apparatus 200 performs photographing during the times that the shutter is opened 540-1 to 540-3, the photographed image may be an image for ½ of each of the frames 510, 520, and 530 output from the display apparatus 100.

For example, while the display apparatus 100 is outputting frame 1, because photographing is performed only during an open time (1/48 second) of the shutter of the photographing apparatus 200, the image for frame 1 photographed from the photographing apparatus 200 may include only the image corresponding to ½ of frame 1. Likewise, while the display apparatus 100 is outputting frame 2 and frame 3, images for frames 2 and 3 photographed from the photographing apparatus 200 may include only images corresponding to ½ of frames 2 and 3, respectively.

Figure 6:
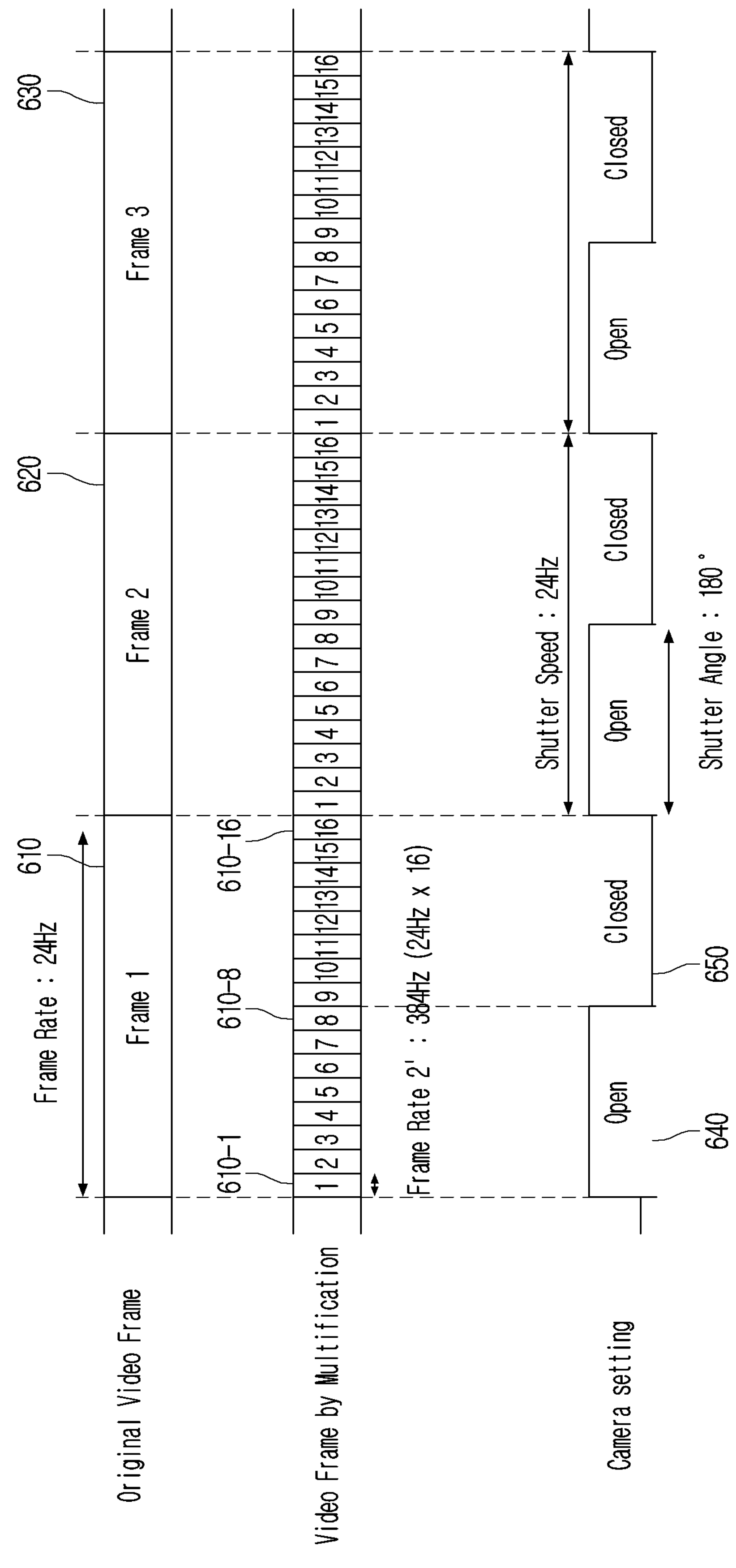
FIG. 6 and FIG. 7 are diagrams illustrating a frame multiplication process of a display apparatus according to one or more embodiments.
Figure 7:
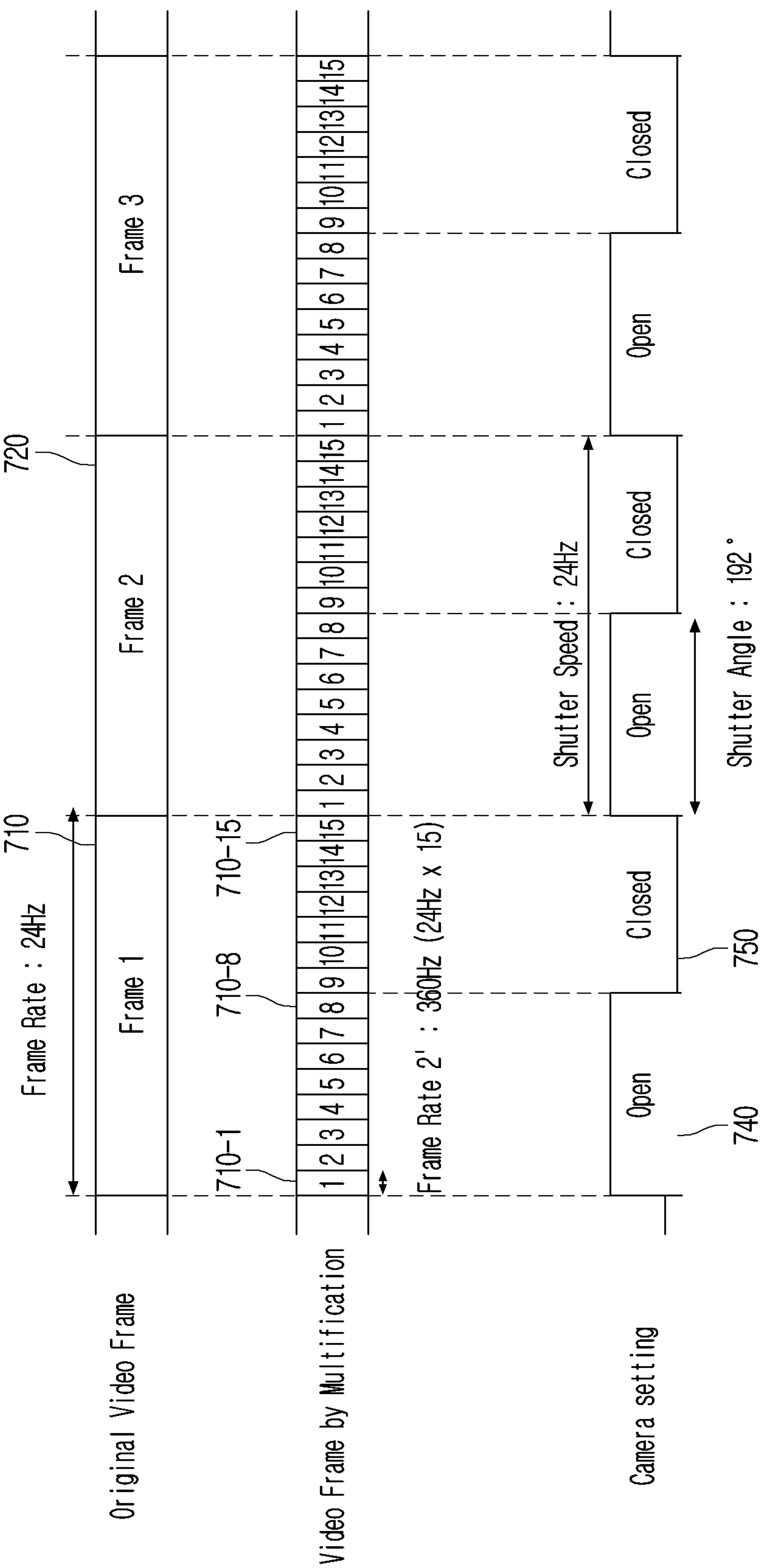

FIG. 6 and FIG. 7 are diagrams illustrating a frame multiplication process of a display apparatus according to one or more embodiments.

According to an embodiment, the display apparatus 100 may control, to prevent the screen tearing phenomenon that is generated in an image photographed from the photographing apparatus 200, the driving frequency of the output image and output each of the frames by performing multiplication. The display apparatus 100 may repeatedly output a frame same as with the frame output from each of the frame sections (hereinafter, referred to as an 'original frame') from each of the frame sections.

Here, each of the frame sections may be a time section in which one frame is output according to the output frequency of the display 110. For example, each of the frame sections may include a first frame section, a second frame section, a third frame section, and the like. According to an example, the display apparatus 100 may repeatedly output a frame that is same as an original frame corresponding to each of the frame sections from the each of the frame sections. For example, if the display apparatus 100 performs multiplication by 16 of the original frame (e.g., frame 1), the display apparatus 100 may output sixteen frames that are the same as frame 1.

As described above, the display apparatus 100 may output, to prevent the screen tearing phenomenon generated by being photographed at a shutter open time of the photographing apparatus, a plurality of frames that is same as the original frame from each of the frame sections so that each frame output time is synchronized to the shutter open time of the photographing apparatus 200. Referring to FIG. 6, the display apparatus 100 may output a plurality of frames that is the same as the original frame from each of the frame sections by performing multiplication of the original frames 610, 620, and 630 that are output from each of the frame sections. For example, the display apparatus 100 may output a plurality of frames 610-1 to 610-16 that is the same as frame 1 610 by performing multiplication by 16 of frame 1 610 from a first frame section corresponding to frame 1 610. For example, the display apparatus 100 may output, based on the shutter angle thereof being 180°, a same number of frames during an open state 640 of the shutter and a closed state 650 of the shutter because time corresponding to the open state 640 and time corresponding to the closed state 650 of the shutter are the same.

Referring to FIG. 7, the display apparatus 100 may perform, based on the shutter angle being changed to 192°, multiplication of each of the frames 710, 720, and 730 based on the changed shutter angle 192°. For example, the display apparatus 100 may output, based on the shutter angle being changed to 192°, a more number of fames during an open state 740 of the shutter than when in a closed state 750 of the shutter because time corresponding to the open state 740 of the shutter is longer than time corresponding to the closed state 750 of the shutter. For example, the display apparatus 100 may output fifteen frames 710-1 to 710-15 which were performed multiplication by 15 based on the shutter speed and the shutter angle, the frames of which eight frames 710-1 to 710-8 were output during the open state 740 of the shutter, and seven frames 710-9 to 710-15 were output during the closed state 750 of the shutter.

According to an example, the display apparatus 100 may output a plurality of frames 610-1 to 610-8 by synchronizing a starting time-point and an ending time-point of the shutter open time of the photographing apparatus 200.

For example, the display apparatus 100 may output, based on the shutter angle being 180°, half 610-1 to 610-8 from among frame 1 that performed multiplication by 16 during the open state 640 of the shutter, and the remaining half thereof 610-9 to 610-16 during the closed state 650 of the shutter.

For example, referring to FIG. 7, the display apparatus 100 may output, based on the shutter angle being 192°, frames 710-1 to 710-8 that exceeded half from among frame 1 that performed multiplication by 15 during the open state 740 of the shutter, and the remaining frames 710-9 to 710-15 during the closed state 750 of the shutter.

For example, the display apparatus 100 may output, based on the shutter angle being 30°, a first frame from among frame 1 that performed multiplication by 12 during the open state of the shutter, and the remaining frames during the closed state of the shutter.

For example, the display apparatus 100 may output, based on the shutter angle being 240°, ten frames from among frame 1 that performed multiplication by 15 during the open state of the shutter, and the remaining frames during the closed state of the shutter.

According to an example, the display apparatus 100 may identify multiplication values of each of the frames (multiplication by 15, multiplication by 16) based on a multiplication information table stored in the memory 120. According to an example, the display apparatus 100 may calculate time that each of the plurality of frames is displayed based on the shutter speed information and the shutter angle information of the photographing apparatus 200, and identify the multiplication value based on the calculated time. Detailed descriptions thereof will be described below.

Figure 8:
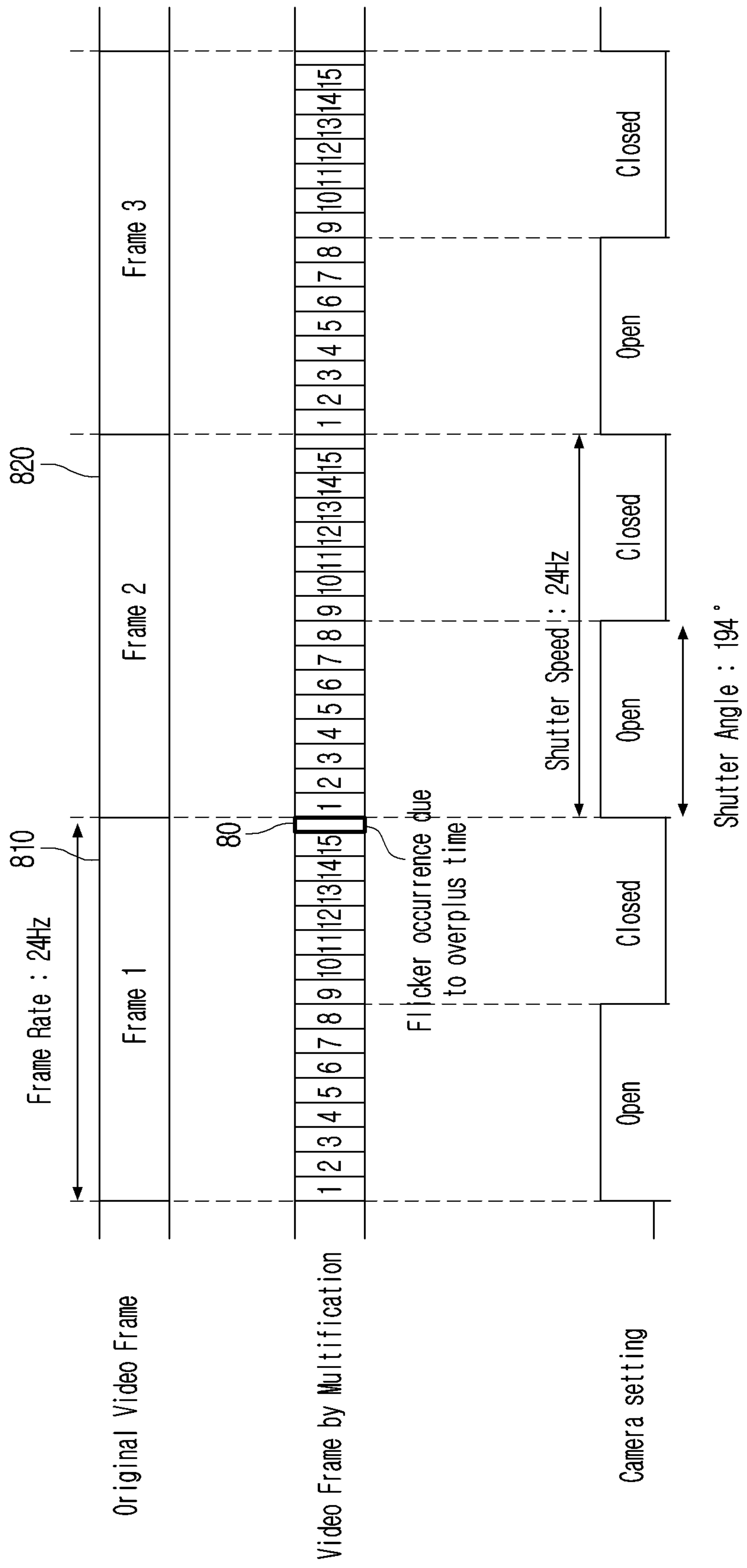
FIG. 8 is a diagram illustrating a flicker phenomenon according to one or more embodiments.

FIG. 8 is a diagram illustrating a flicker phenomenon according to one or more embodiments.

According to an embodiment, the display apparatus 100 may identify, based on performing frame multiplications based on the shutter speed and the shutter angle, an overplus-time based on a difference in time that each of the frame sections and the plurality of frames are displayed.

Here, the overplus-time may refer to time that is generated due to the last frame from among the plurality of frames failing to reach a whole driving time of each of the corresponding sections due to the multiplication value identified based on the shutter speed and the shutter angle not corresponding to an integer multiple. For example, if the ending time-point of the last frame from among the plurality of frames that performed multiplication of frame 1 that is provided in the first frame section and an ending time-point of the first frame section are not synchronized, an overplus-time from the ending time-point of the last frame to the ending time-point of frame 1 may be generated. The overplus-time is not limited thereto, and may be variously designated as an un-reached time, a frame reaching time, a frame exceeding time, and the like, but the term will be collectively referred to as the overplus-time in the disclosure.

Referring to FIG. 8, the display apparatus 100 may output, based on the shutter speed of the photographing apparatus 200 being 24 Hz, and the shutter angle thereof being 194°, same fifteen frames 810-1 to 810-15 by performing multiplication by 15 of frame 1 810. In this case, even if multiplication by 15 of frame 1 810 is performed differently to when the shutter angle is 192° in FIG. 7, the display apparatus 100 may exhibit no screen output for an angle value of 2° and for about 231 μs of time. For example, the display apparatus 100 may output a black screen 80 which has no screen output for a corresponding time. For example, the display apparatus 100 may output the last frame corresponding to frame 1 and output frame 2 820 after 231 μs have passed. At this time, the flicker phenomenon may be generated according to the screen brightness between an output time-point of the last frame corresponding to frame 1 810 and an output time-point of an initial frame corresponding to frame 2 820 in the display apparatus 100.

Figure 9:
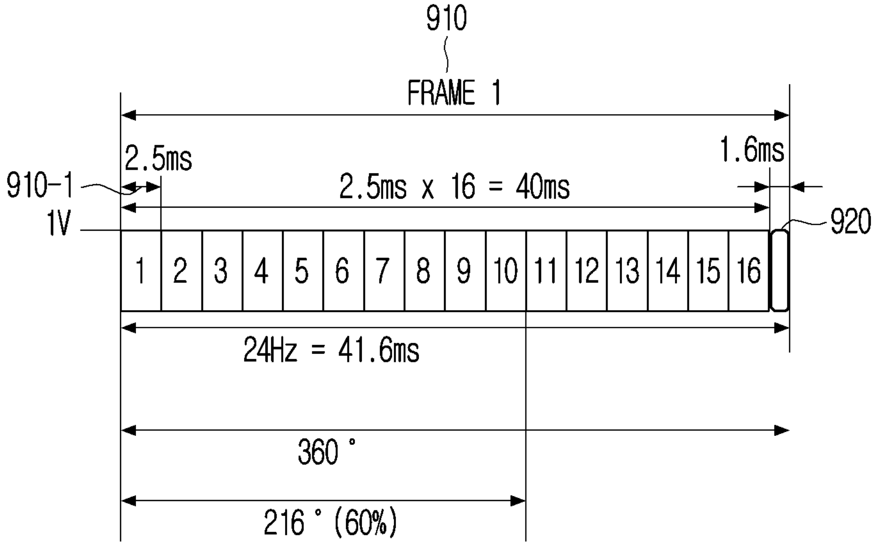
FIG. 9 is a diagram illustrating multiplication information and a process for identifying overplus-time according to one or more embodiments.

FIG. 9 is a diagram illustrating multiplication information and a process for identifying overplus-time according to one or more embodiments.

According to an embodiment, the display apparatus 100 may identify time that each of the plurality of frames is displayed based on the identified shutter speed information and the identified shutter angle information.

According to an embodiment, the display apparatus 100 may identify multiplication information of the frame based on the time that each of the plurality of frames is displayed.

According to an embodiment, the display apparatus 100 may identify an overplus-time for increasing the driving time of the last frame from among the plurality of frames.

Referring to FIG. 9, the display apparatus 100 may calculate, based on the shutter speed of the photographing apparatus 200 being 24 Hz, and the shutter angle being 216°, an output time of one frame 910-1 from among a plurality of frames 910-1 to 910-16 which performed multiplication of frame 1 910 through the equation below.

$$\text{frame output time(s)} = \text{shutter speed} \times \frac{\text{shutter angle}}{360^\circ} \quad \text{[Equation 1]}$$

According to an example, the display apparatus 100 may calculate, based on the shutter speed being 24 Hz, and the shutter angle being 216°, an output time for one frame 910-1 from among the plurality of frames as $$\frac{1}{24} \times \frac{216^\circ}{360^\circ} = 2.5 \text{ ms}$$

based on Equation 1.

If a driving frequency for frame 1 910 of the display apparatus 100 is 24 Hz (41.5 ms if converted to a unit of time(s)), the display apparatus 100 may identify the multiplication value (16.64) based on an output time (2.5 ms) for one frame 910-1 from among the plurality of frames and an output time (41.5 ms) for frame 1 910.

According to an embodiment, the display apparatus 100 may identify, based on performing multiplication by 16 of frame 1 910, time corresponding to performing multiplication by 0.64 of one frame from among the plurality of frames, that is, an overplus-time 920 of 1.6 ms.

Figure 10:
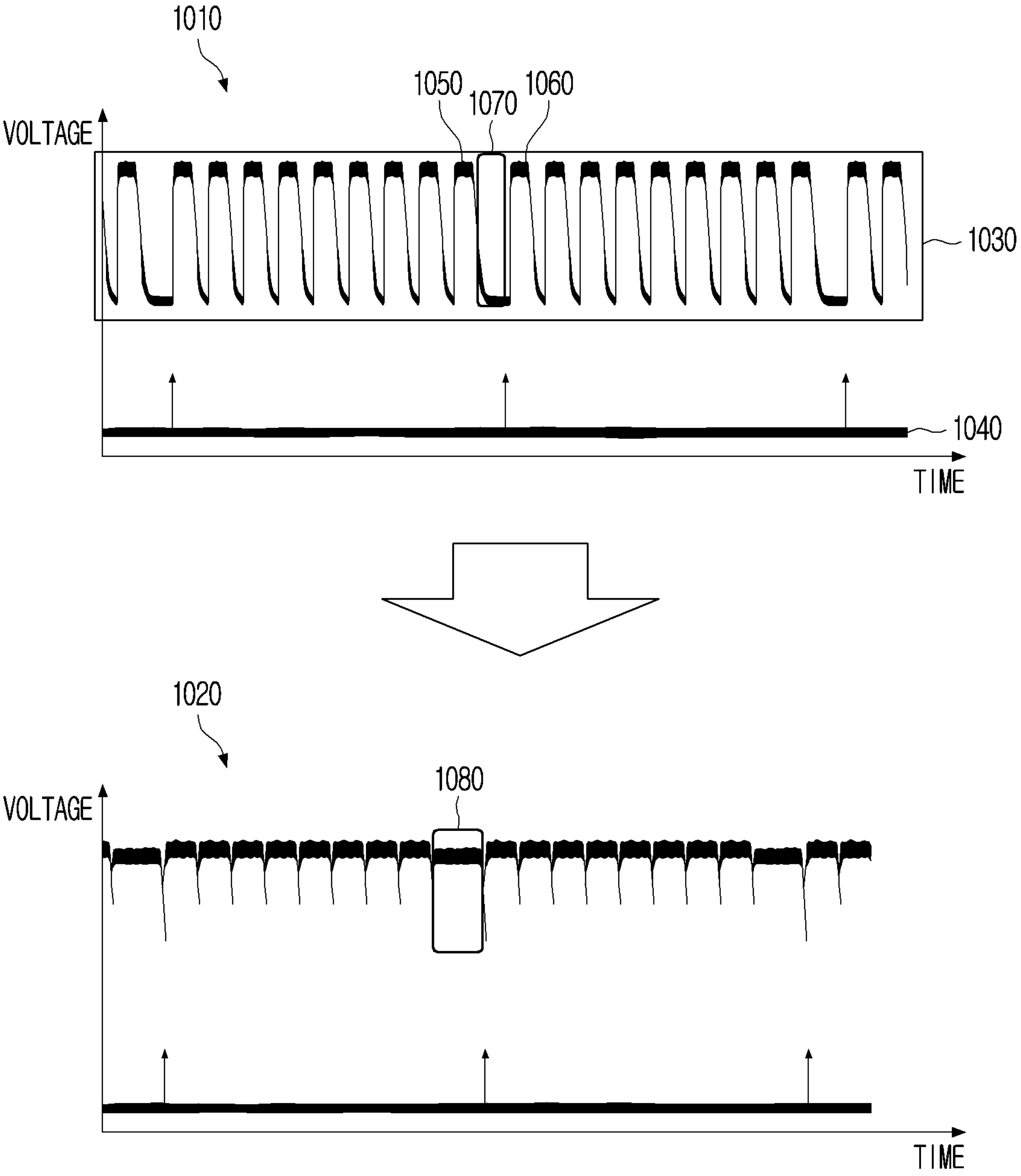
FIG. 10 and FIG. 11 are diagrams illustrating a compensation method of a frame driving signal according to one or more embodiments.
Figure 11:
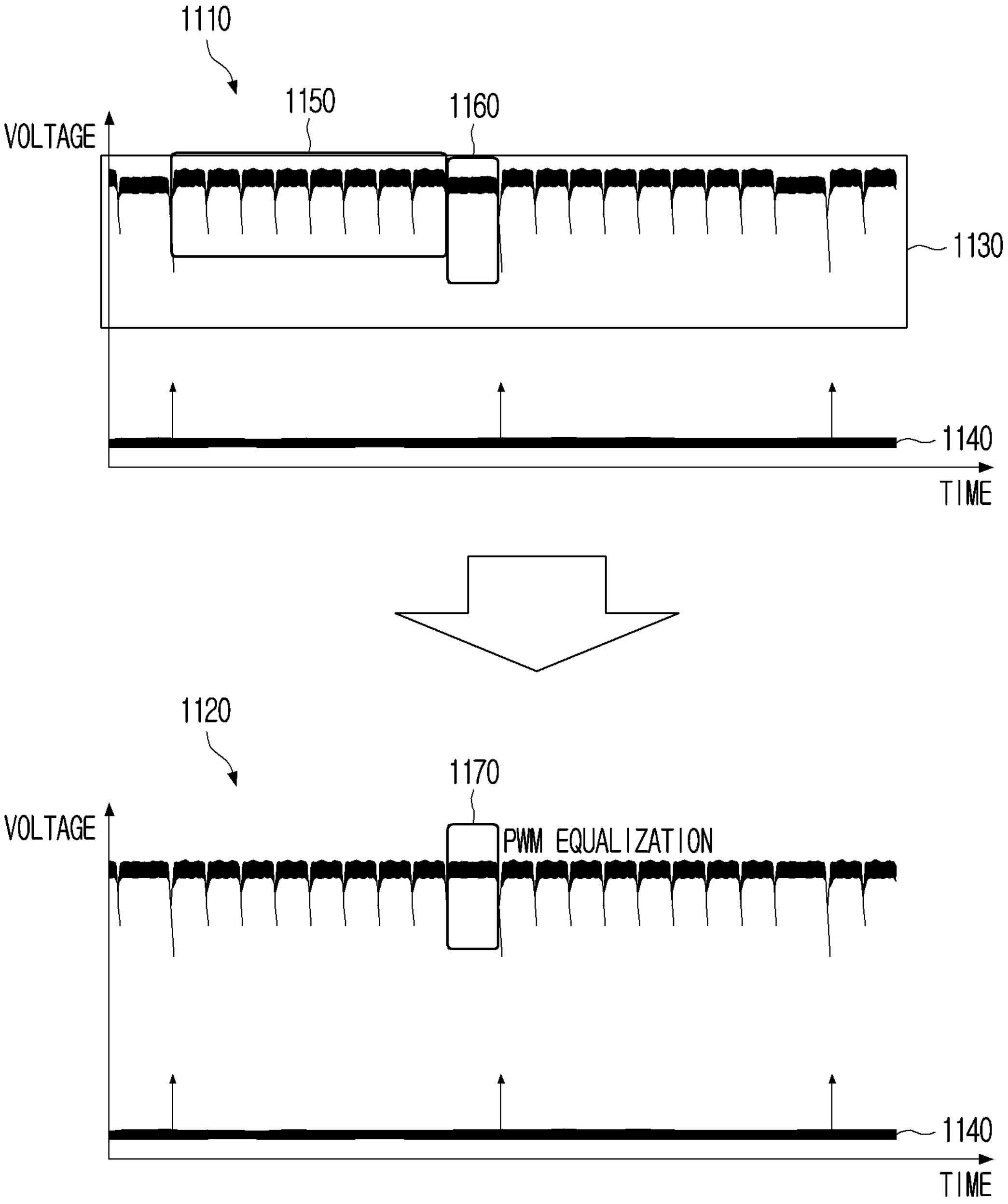

FIG. 10 and FIG. 11 are diagrams illustrating a compensation method of a frame driving signal according to one or more embodiments.

According to an embodiment, the display apparatus 100 may identify the pulse width modulation (PWM) signal of the plurality of frames displayed in each of the frame sections based on the multiplication information of the frame.

Referring to FIG. 10 and FIG. 11, the display apparatus 100 may identify frequency signals (or frame rates) of the plurality of frames for each of the frame sections.

The display apparatus 100 may identify PWM waveform graphs 1010, 1020, 1110, and 1120 that uses a voltage value and a driving time as variables based on frequency signals of each of the plurality of frames.

In the PWM waveform graphs 1010, 1020, 1110, and 1120, a horizontal axis represents time and a vertical axis represents a voltage value, for example, may refer to a voltage value for driving the LEDs.

Graphs 1030 and 1130 positioned at an upper end of the PWM waveform graphs 1010, 1020, 1110, and 1120 may mean a PWM signal for the plurality of frames, and graphs 1040 and 1140 positioned at a lower end thereof may mean a vertical synchronous signal (Vsync). Here, the vertical synchronous signal may be a signal for synchronizing a vertical readjustment of the display apparatus 100, and may mean a signal for identifying a starting point of each of the frames that the display 110 outputs.

According to an embodiment, the display apparatus 100 may identify a time-point at which each of the frames included in an image are output based on the vertical synchronous signal. According to an example, the display apparatus 100 may identify a frame scan rate based on the vertical synchronous signal, and identify an overplus-time based on the frame scan rate. For example, the display apparatus 100 may identify the starting time-points and the ending time-points of each of the frame sections based on the frame scan rate, and identify the overplus-time based therefrom. In addition, the display apparatus 100 may identify a time-point at which each of the plurality of frames is output based on the vertical synchronous signal corresponding to each of the plurality of frames in which multiplication is performed for each of the frames.

According to an embodiment, the display apparatus 100 may compensate for an application time of voltage corresponding to the PWM signal of the last frame from among the plurality of frames based on the overplus-time. According to an embodiment, the display apparatus 100 may increase the application time of voltage corresponding to the PWM signal of the last frame from among the plurality of frames by time equal to the overplus-time.

According to an example, the display apparatus 100 may control the driving time of the last frame from among the plurality of frames by time equal to the overplus-time. Referring to FIG. 10, the display apparatus 100 may identify an overplus-time 1070 between a PWM signal 1050 of the last frame for frame 1 and a PWM signal 1060 of a first frame for frame 2 from a PWM signal 1030 for a plurality of frames. The display apparatus 100 may compensate for the driving time of the last frame, that is, the on-time of the last frame by time equal to the overplus-time. Accordingly, the display apparatus 100 may identify a PWM driving signal 1080 of a form in which the driving time of the last frame from among the plurality of frames is more increased than the driving time of the remaining frames.

For example, as in FIG. 9, the display apparatus 100 may control the driving time of the last frame to calculate 1.6 ms which is the overplus-time, and to control for the driving time of the last frame from among the plurality of frames to output as 4.1 ms that added 1.6 ms.

According to an embodiment, the display apparatus 100 may apply the same power to all of the plurality of frames by controlling the driver IC provided in the display 110. The display apparatus 100 may control the driver IC to apply power including the same time and the same voltage value to each of the frames to output the same luminance (screen brightness) to all of the plurality of frames. For example, the display apparatus 100 may apply power including 1V and 10 ms value to each of the frames by controlling the driver IC.

However, based on applying the same power as the remaining frames to the last frame from among the plurality of frames during the first frame section while increasing the on-time, the display apparatus 100 may output the amplitude of the last frame, that is, the frame with the voltage value decreased. In other words, the display apparatus 100 may output the last frame with an increased on-time at a brightness lower than the remaining frames except for the last frame from among the plurality of frames during the first frame section.

According to an embodiment, the display apparatus 100 may compensate for the amplitude corresponding to the PWM signal of the last frame from among the plurality of frames during the first frame section and compensate for the luminance of the last frame.

According to an embodiment, the display apparatus 100 may compensate for the amplitude of voltage corresponding to the last frame based on the amplitude of voltage corresponding to the remaining frames from among the plurality of frames during the first frame section. According to an example, the display apparatus 100 may increase the amplitude of voltage corresponding to the last frame to correspond to the amplitude of voltage corresponding to the remaining frames.

Referring to FIG. 11, the display apparatus 100 may output a last frame 1160 with an amplitude relatively lower than an amplitude of the remaining frames 1150 from among the plurality of frames for the first frame section. In other words, the display apparatus 10 may output the last frame 1160 with a relatively low voltage than a voltage of the remaining frames 1150 for the first frame section. That is, because the display apparatus 100 applies the same power to all of the respective frames through the driver IC, the last frame with an extended on-time is output at a brightness lower than the remaining frames.

To compensate for the above, the display apparatus 100 may perform a PWM signal equalization of the driving voltage of the last frame based on the driving voltage of the remaining frames during the first frame section. The PWM signal equalization may mean a process for controlling a voltage value of the PWM signal for each of the frames to be the same.

For example, as shown in FIG. 9, the display apparatus 100 may increase the driving time of the last frame to 4.1 ms based on the overplus-time. For example, if the display apparatus 100 applied a voltage of 1V to each of the frames through the driver IC to all be the same, an amplitude value of 0.61V may be calculated by multiplying a ratio by time equal to the driving time increased by the voltage of 1V based on the driving time being increased with respect to the last frame. In this case, the display apparatus 100 may additionally further apply 0.39V for the PWM signal equalization to the last frame by controlling the driver IC.

According to an example, the display apparatus 100 may output a driving signal 1170 of a same voltage value as the remaining frames by further applying an additional voltage to the last frame through the PWM signal equalization.

As described above, the display apparatus 100 may prevent the flicker phenomenon from occurring between the last frame corresponding to frame 1 and the first frame corresponding to frame 2 by compensating for the driving time and amplitude of the last frame from among the plurality of frames.

FIG. 12 is a diagram illustrating a UI providing method that includes multiplication information according to one or more embodiments.

According to an embodiment, the display apparatus 100 may provide a UI including multiplication information according to the plurality of shutter angle information corresponding respectively to the plurality of shutter speed information stored in the memory 120 through the display 110.

According to an embodiment, the display apparatus 100 may provide a UI including a look up table that includes the multiplication information calculated based on the shutter speed information and the shutter angle information through the display 110. The look up table may refer to data in a table form in which result values that were pre-calculated based on consecutive values or a specific value are stored. However, the look up table is not limited thereto, and may be variously designated as a search table, a mapping table, an index table, and the like, but will be collectively referred to as the look up table in the disclosure.

Referring to FIG. 12, the display apparatus 100 may provide a UI including the plurality of shutter angle information corresponding respectively to the plurality of shutter speed information through the display 110. The display apparatus 100 may provide a UI including the multiplication information of the frame corresponding to a specific shutter speed information and a specific shutter angle information through the display 110.

For example, if a driving frequency 1210 for an output image of the display apparatus 100 is input, the display apparatus 100 may provide a UI including a plurality of shutter speed information 1220, shutter angle information 1230, and multiplication information 1240 through the display 110.

According to an example, the display apparatus 100 may provide a UI including the most generically used shutter speed information, shutter angle information, and multiplication information. For example, the display apparatus 100 may provide a UI including multiplication information for shutter speed information of 24 Hz and 48 Hz and shutter angle information of 180° and 192°, respectively, through the display 110.

According to an embodiment, the display apparatus 100 may identify, based on one from among the multiplication information provided through the UI being selected according to the user input, the multiplication information of the frame based on the selected multiplication information. For example, the display apparatus 100 may identify, based on the user input for the shutter speed of 24 Hz and the shutter angle of 180° being received, the multiplication information corresponding to the received shutter speed and shutter angle.

According to an example, the display apparatus 100 may provide the look up table including the shutter speed information, the shutter angle information, and the multiplication information to the user, and receive the user input based on the look up table. The display apparatus 100 may perform multiplication of the frame based on the user input. The display apparatus 100 may compensate for the application time and amplitude of voltage corresponding to the driving signal of the last frame from among the plurality of frames.

According to an example, the display apparatus 100 may receive a user input based on a specific shutter speed and a specific shutter angle. The display apparatus 100 may perform multiplication of the frame based on the user input, and compensate for the application time and amplitude of voltage of the last frame from among the plurality of frames.

According to an embodiment, the display apparatus 100 may include an LED display including a plurality of LED pixels. The display apparatus 100 may perform multiplication of the driving frequency of the LED display to correspond to the plurality of frames displayed in each of the frame sections based on the multiplication information of the frame. The display apparatus 100 may synchronize the photographing of the photographing apparatus 200 and the driving of the LED display based on the driving frequency performed with multiplication.

According to an embodiment, the display apparatus 100 may display a background image in the display 110 by performing multiplication of the frame corresponding to the background image. The photographing apparatus 200 may obtain the background image displayed in the display 110 and an image that photographed the user positioned at the front direction of the background image.

Figure 13:
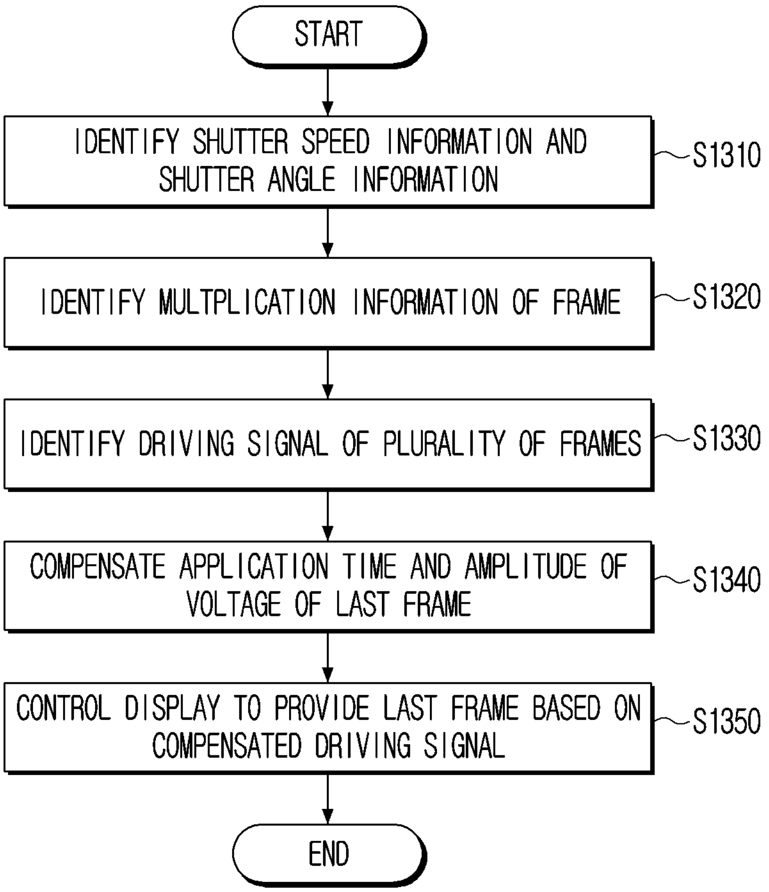
FIG. 13 is a diagram illustrating a controlling method of a display apparatus according to one or more embodiments.

FIG. 13 is a diagram illustrating a controlling method of a display apparatus according to one or more embodiments.

Referring to FIG. 13, in step 1310, the display apparatus 100 may identify the shutter speed information and the shutter angle information corresponding to the photographing apparatus 200.

In step 1320, the display apparatus 100 may identify the multiplication information of the frame based on the identified shutter speed information and the identified shutter angle information.

In step 1330, the display apparatus 100 may identify the driving signal of the plurality of frames displayed in each of the frame sections based on the multiplication information of the frame.

In step 1340, the display apparatus 100 may compensate for the application time and amplitude of voltage corresponding to the driving signal of the last frame based on each of the frame sections being longer than the time that the plurality of frames is displayed.

In step 1350, the display apparatus 100 may control the display 110 to provide the last frame based on the compensated driving signal.

Because the method of identifying the multiplication information of the frame based on the shutter speed information and the shutter angle information, and compensating for the application time and amplitude of voltage corresponding to the driving signal of the last frame has been described in detail in the various embodiments described above, redundant descriptions thereof will be omitted.

The controlling method described in FIG. 13 may be performed by the display apparatus 100 having the configurations of FIG. 2, but is not necessarily limited thereto, and may be performed by a display apparatus having various configurations.

The various embodiments described above may be implemented singularly in an embodiment, or the at least one embodiment may be implemented as a whole or partially combined with one another together with one apparatus.

According to the various embodiments described above, the display apparatus may output, based on photographing according to various shutter speeds and shutter angles of the photographing apparatus, the screen tearing phenomenon for each of the frames and consecutive frames without the flicker phenomenon.

Meanwhile, according to the various embodiments described above, an embodiment may applied singularly to a product, or at least a portion of the description may be implemented combined together with another embodiment of the disclosure.

The various embodiments described above may be implemented with software including instructions stored in a machine-readable storage media (e.g., computer). The machine may call a stored instruction from the storage medium, and as an apparatus operable according to the called instruction, may include an electronic apparatus (e.g., display apparatus 100) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in a form of a non-transitory computer-readable storage medium. Herein, 'non-transitory' merely means that the storage medium is tangible and does not include a signal, and the term does not differentiate data being semi-permanently stored or being temporarily stored in the storage medium.

In addition, according to an embodiment of the disclosure, a method according the various embodiments described above may be provided included a computer program product.

Specifically, a non-transitory computer-readable storage medium or a computer program product that stores computer instructions to perform operations, the operations including identifying the shutter speed information and the shutter angle information corresponding to the photographing apparatus, identifying multiplication information of a frame based on the identified shutter speed information and the identified shutter angle information, identifying a driving signal of the plurality of frames displayed in each of frame sections based on multiplication information of the frame, compensating for the application time and amplitude of voltage corresponding to the driving signal of the last frame based on each of the frame sections being longer than the time that the plurality of frames is displayed, and controlling the display to provide the last frame based on the compensated driving signal, may be provided.

The computer program product may be distributed in a form of the machine-readable storage medium (e.g., a compact disc read only memory (CD-ROM)), or distributed online through an application store (e.g., PLAYSTORE™). In the case of online distribution, at least a portion of the computer program product may be stored at least temporarily in a storage medium such as a server of a manufacturer, a server of an application store, or a memory of a relay server, or temporarily generated.

In addition, computer instructions or programs for performing controlling methods and the like of the display apparatus according to the various embodiments described above may be stored in a non-transitory computer-readable medium. The computer instructions stored in this non-transitory computer-readable medium may cause a specific device to perform processing operations in the apparatus according to the above-described various embodiments when executed by the processor of the specific apparatus. The non-transitory computer readable medium may refer to a medium that stores data semi-permanently rather than storing data for a very short time, such as a register, a cache, a memory, or the like, and is readable by a device. Specific examples of the non-transitory computer-readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:

a display;

a memory that stores one or more instructions; and one or more processors configured to, by executing the one or more instructions, identify shutter speed information and shutter angle information corresponding to a photographing apparatus, identify multiplication information of a frame based on the identified shutter speed information and the identified shutter angle information, identify driving signals for repeatedly outputting, in sections of the frame, a same frame as an original frame of the frame based on the identified multiplication information, compensate an application time and amplitude of a voltage of a driving signal of the identified driving signals for outputting a last same frame of the frame, based on a time for displaying the sections being longer than a time for displaying the original frame and each same frame, and control the display to provide the last same frame based on the driving signal having the compensated application time and the compensated amplitude of the voltage.

2. The display apparatus of claim 1, wherein the driving signals are pulse width modulation (PWM) signals.

3. The display apparatus of claim 2, wherein the one or more processors are configured to, by executing the one or more instructions, identify an overplus-time based on a difference in the time for displaying the sections and the time for displaying the original frame and each same frame, compensate for the application time of the voltage of the PWM signal that is the driving signal for outputting the last same frame based on the identified overplus-time, and compensate for the amplitude of the voltage of the PWM signal that is the driving signal for outputting the last same frame based on an amplitude of a voltage of PWM signals that are driving signals for outputting remaining same frames of the same frame repeatedly output.

4. The display apparatus of claim 3, wherein the one or more processors are configured to, by executing the one or more instructions, increase the application time of the voltage of the PWM signal that is the driving signal for the last same frame by a time equal to the overplus-time, and increase the amplitude of the voltage of the PWM signal that is the driving signal for outputting the last same frame to correspond to an amplitude of a voltage of PWM signals that are driving signals for outputting the remaining same frames.

5. The display apparatus of claim 1, further comprising:

a memory storing multiplication information according to a plurality of shutter angle information corresponding respectively to a plurality of shutter speed information, wherein the one or more processors are configured to, by executing the one or more instructions, provide, through the display, a user interface (UI) including multiplication information according to the plurality of shutter angle information corresponding respectively to the plurality of shutter speed information stored in the memory.

6. The display apparatus of claim 5, wherein the one or more processors are configured to, by executing the one or more instructions, identify, based on one from among the multiplication information included in the UI provided through the display being selected according to a user input, multiplication information of the frame based on the selected multiplication information.

7. The display apparatus of claim 1, wherein the one or more processors are configured to, by executing the one or more instructions, identify a time that each same frame is to be displayed based on the identified shutter speed information and the identified shutter angle information, and identify the multiplication information of the frame based on the time that each same frame is to be displayed.

8. The display apparatus of claim 1, wherein the multiplication information is information indicating a number of times that the same frame is to be displayed in each of the sections.

9. The display apparatus of claim 1, wherein the display is a light emitting diode (LED) display including a plurality of LED pixels, and the one or more processors are configured to, by executing the one or more instructions, synchronize photographing of the photographing apparatus and driving of the LED display by performing multiplication of a driving frequency of the LED display to correspond to same frames displayed in each of the sections based on multiplication information of the frame.

10. The display apparatus of claim 1, wherein the one or more processors are configured to, by executing the one or more instructions, display a background image in the display by performing multiplication of a frame corresponding to the background image, and the photographing apparatus is configured to obtain an image which photographed the background image displayed in the display and a user positioned at a front direction of the background image.

11. A controlling method of a display apparatus, the controlling method comprising:

identifying shutter speed information and shutter angle information corresponding to a photographing apparatus;

identifying multiplication information of a frame based on the identified shutter speed information and the identified shutter angle information;

identifying driving signals for repeatedly outputting, in sections of the frame, a same frame as an original frame of the frame based on the identified multiplication information;

compensating an application time and amplitude of a voltage of a driving signal of the identified driving signals for outputting a last same frame, based on a time for displaying the sections being longer than a time for displaying the original frame and each same frame, and controlling the display to provide the last same frame based on the driving signal having the compensated application time and the compensated amplitude of the voltage.

12. The controlling method of claim 11, wherein the driving signals are pulse width modulation (PWM) signals.

13. The controlling method of claim 12, wherein the compensating an application time and amplitude of a voltage includes:

identifying an overplus-time based on a difference in the time for displaying the sections and the time for displaying the original frame and each same frame, compensating for the application time of the voltage of the PWM signal that is the driving signal for outputting the last same frame based on the identified overplus-time, and compensating for the amplitude of the voltage of the PWM signal that is the driving signal for outputting the last same frame based on an amplitude of a voltage of PWM signals that are driving signals for outputting remaining frames of the same frame repeatedly output.

14. The controlling method of claim 13, comprising increasing the application time of the voltage of the PWM signal that is the driving signal for the last same frame by a time equal to the overplus-time, and increasing the amplitude of the voltage of the PWM signal that is the driving signal for outputting the last same frame to correspond to an amplitude of a voltage of the PWM signals that are driving signals for outputting the remaining frames.

15. The controlling method of claim 11, comprising:

the display apparatus storing multiplication information according to a plurality of shutter angle information corresponding respectively to a plurality of shutter speed information, providing, a user interface (UI) including multiplication information according to the plurality of shutter angle information corresponding respectively to the plurality of shutter speed information stored in the display apparatus.

16. The controlling method of claim 15, identifying, based on one from among the multiplication information included in the UI provided through the display being selected according to a user input, multiplication information of the frame based on the selected multiplication information.

17. The controlling method of claim 11, identifying a time that each same frame is to be displayed based on the identified shutter speed information and the identified shutter angle information, and identifying the multiplication information of the frame based on the time that each same frame is to be displayed.

18. The controlling method of claim 11, wherein the multiplication information is information indicating a number of times that the same frame is to be displayed in each of the sections.

19. A non-transitory computer-readable storage medium storing computer instructions for a display apparatus to perform operations when executed by a processor of the display apparatus, the operations comprising:

identifying shutter speed information and shutter angle information corresponding to a photographing apparatus;

identifying multiplication information of a frame based on the identified shutter speed information and the identified shutter angle information;

identifying driving signals for repeatedly outputting, in sections of the frame, a same frame as an original frame of the frame based on the identified multiplication information;

compensating an application time and amplitude of a voltage of a driving signal of the identified driving signals for outputting a last same frame, based on a time for displaying the sections being longer than a time for displaying the original frame and each same frame; and controlling the display to provide the last same frame based on the driving signal having the compensated application time and the compensated amplitude of the voltage.

20. The non-transitory computer readable recording medium as claimed in claim 19, wherein the driving signals are pulse width modulation (PWM) signals.

* * * * *